No. 698,603. Patented Apr. 29, 1902.
T. E. WIEDERSEIM, Jr.
BOOK.
(Application filed Jan. 18, 1902.)
(No Model.)
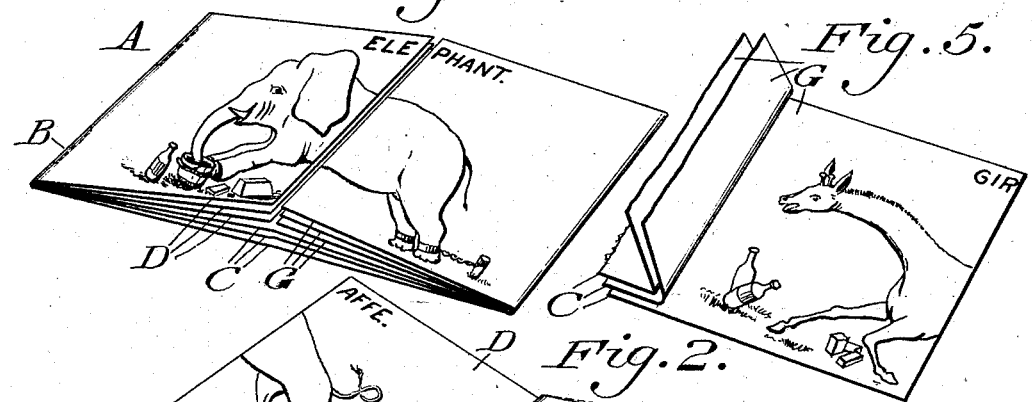
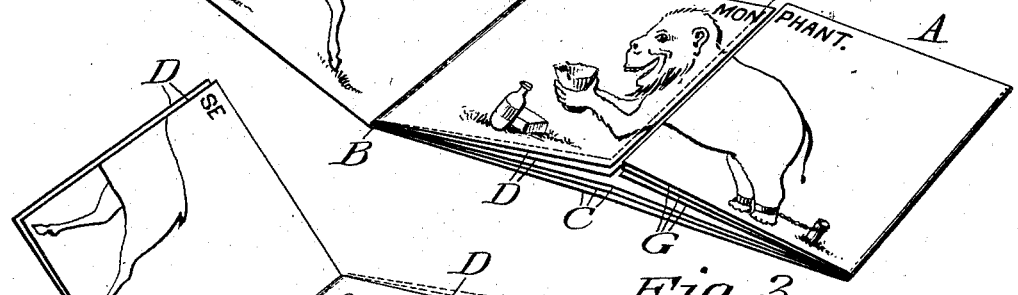
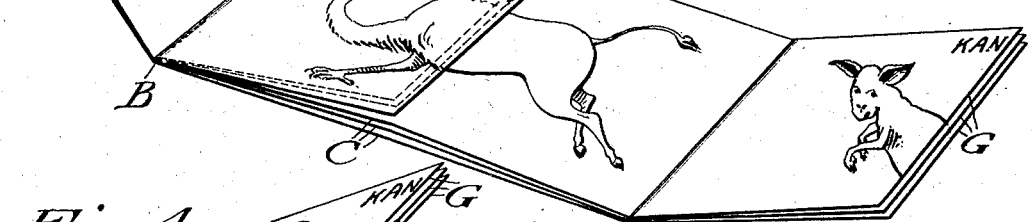
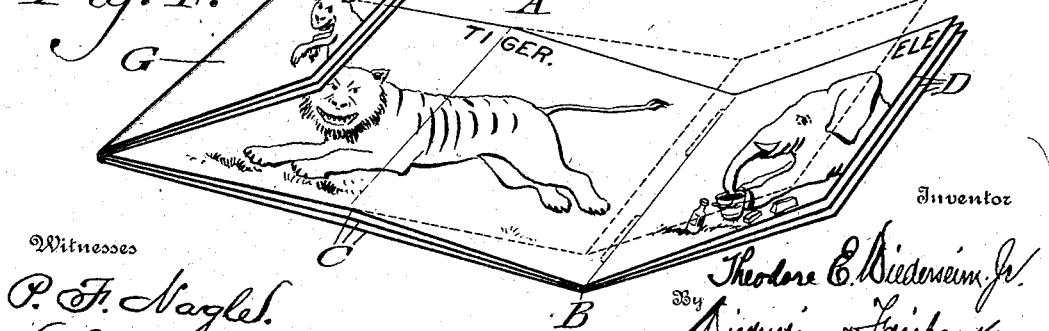
Witnesses
Inventor
Theodore E. Wiederseim, Jr.
By Wiederseim & Fairbanks,
Attorneys

UNITED STATES PATENT OFFICE.

THEODORE E. WIEDERSEIM, JR., OF PHILADELPHIA, PENNSYLVANIA.

BOOK.

SPECIFICATION forming part of Letters Patent No. 698,603, dated April 29, 1902.

Application filed January 18, 1902. Serial No. 90,247. (No model.)

*To all whom it may concern:*

Be it known that I, THEODORE E. WIEDERSEIM, Jr., a citizen of the United States, residing in the city and county of Philadelphia, State of Pennsylvania, have invented a new and useful Improvement in Books, of which the following is a specification.

My invention consists of an improved construction of a book or pamphlet, being especially adapted for an interchangeable-picture book or pamphlet, and the same comprising leaves of different lengths, some of which contain full pictures of certain figures and others sections of certain figures so arranged that they can be employed to exhibit the picture of certain well-known figures—for instance, animals—or which by their interchangeability may be employed to exhibit pictures of various made-up figures—for instance, the head and shoulders of certain animals in connection with the body and hind legs of another animal, &c.

The invention further consists in the features of construction hereinafter described, and pointed out in the appended claims.

Figure 1 represents a perspective view of the book or pamphlet embodying my invention with the leaves slightly separated. Fig. 2 represents a perspective view with the upper inner leaf raised. Fig. 3 represents a perspective view with two of the inner leaves raised and the three sections of the outer section raised. Fig. 4 represents a perspective view taken from the reverse side with the inner leaves raised and the outer-section leaves raised. Fig. 5 represents a perspective view showing the lower outer section illustrated in Fig. 1 and a portion of the inner ends of the other two outer sections.

Similar letters of reference indicate corresponding parts in the figures.

Referring to the drawings, A designates the book, B being the back thereof. It is understood, however, that although I have shown and will describe my invention as made up in book form—that is to say, with the different leaves bound along the line B—yet it is understood that it can be made in the form of a pamphlet so long as it is secured together to provide a plurality of back or main leaves C and a plurality of leaves D, which are attached or form part of said leaves C, and which I will hereinafter call "inner" leaves, since the same are adjacent to the bound ends of the main leaves, the length of the former being approximately a multiple of the length of the latter. This arrangement provides a plurality of long main leaves C and a plurality of short inner leaves D. The main leaves C have outer leaves or sections G on the opposite end from that of the front leaves D and which can be folded upon the main leaves C thereof in both directions, the length of the main leaves C being approximately multiples of the length of said sections.

The inner leaves D and the outer sections G of the main leaves C are each provided with a section or portion of the figure, the corresponding leaves D and sections G, as shown in Fig. 1, bearing sections of the same figures—for instance, as I have selected animals to illustrate my invention, in Fig. 1 the uppermost inner leaf D and uppermost section G contain the two sections of an elephant—so that when placed in this position the picture shown in Fig. 1 is exposed. However, if this uppermost inner leaf D (shown in Fig. 1) only is raised the next inner leaf below, which, in connection with the next outer section G, would exhibit a complete picture of a monkey, shows only half of a monkey, as the uppermost outer section G has not been raised. Then we have a picture containing the head and shoulders of a monkey and the body and hind legs of an elephant, it being noted that the different pictures and sections of pictures are so arranged as to be interchangeable—that is to say, when they are combined in any relation the two sections of the pictures fit each other. For instance, as shown in Fig. 3 the third inner leaf D is exposed and all of the sections G have been raised to show the rear section of the figure on the uppermost main leaf C. This latter figure happens to be a mule, while the section of the figure carried by the lowermost inner leaf D is the head and shoulders of an ostrich, so that we have a picture showing the head and shoulders of an ostrich and the body and hind legs of a mule. It is evident that these different leaves and sections may be interchanged to produce a large variety of conventional pictures of animals as well as the made-up pictures of the character shown in Figs. 2 and 3.

Both sides of the inner leaves D and outer sections G and the main leaves C have these sectional pictures and pictures, so that the book or pamphlet can be reversed, as shown in Fig. 4. In this figure it will be seen that the picture on the exposed portion of the uppermost section G is the fore part of a kangaroo, the same being shown to the right in Fig. 3, where the book is shown before it has been turned, it being understood that the other sections G have other sections of pictures to correspond with sections of pictures on the other sides of inner leaves D shown in said Fig. 4.

Fig. 5 shows the outer sections G with two upper ones folded or raised to illustrate the picture of a section of a giraffe on the lower section.

Another feature of my invention is the manner in which the names of the different animals or figures are arranged—that is to say, I arrange different syllables on the inner leaves and on the outer sections, so that when they are interchanged they spell a fanciful word. For instance, as shown in Fig. 2, where the picture shows the head and shoulders of a monkey and the body and hind legs of an elephant, the name "Monphant" is formed by the syllables exposed on the inner leaf D and section G forming this picture, it being noted that if the leaves were reversed it would show the head and shoulders of an elephant and the body and hind legs of a monkey, and the name spelled then would be "Elekey." Further, as shown in Fig. 3 the picture is that of the head and shoulders of an ostrich and the body and hind legs of a mule, and the word spelled is "Ostle."

It is understood, of course, that various changes can be made in the different parts—that is to say, the number of the leaves can be varied as found convenient or the number of sections of either leaves can be increased—without departing from the spirit of my invention, and, furthermore, it is obvious that other figures or characters may be employed in place of the pictures of animals, and therefore, except in the claims for the specific construction, my invention is not limited to the specific features herein shown. The device can be used for various purposes, among which may be mentioned a book for amusement or an advertising medium, as will be obvious.

Having thus described my invention, what I claim as new, and desire to secure by Letters Patent, is—

1. A book or pamphlet comprising a plurality of main leaves, each consisting of a main portion and an outer foldable section, and a plurality of inner leaves, the length of the back leaves being approximately a multiple of the length of said sections and of said inner leaves.

2. A book or pamphlet consisting of a plurality of leaves, each leaf consisting of a main portion and an outer foldable section, the latter being approximately half the length of the former, and a plurality of inner leaves of approximately the length of said sections.

3. A book or pamphlet comprising a plurality of main leaves, each consisting of a main portion and an outer foldable section, and a plurality of inner leaves, the length of the main portions of the back leaves being approximately a multiple of the length of said sections and of said inner leaves, said main portions of the back leaves being provided with complete pictures, and said sections and inner leaves being provided with interchangeable sections of pictures.

4. A book or pamphlet comprising a plurality of main leaves, each consisting of a main portion and an outer foldable section, and a plurality of inner leaves, the length of the main portion of the back leaves being approximately a multiple of the length of said sections and of said inner leaves, said main portions being provided with pictures, and said sections and inner leaves being provided with sections of pictures interchangeable with each other and with the pictures of the main portions.

5. A book or pamphlet consisting of a plurality of main leaves, each leaf consisting of a main portion and an outer section foldable upon both sides of said main portion, and a plurality of inner leaves foldable upon both sides of said back leaves, the length of the main portions of said back leaves being a multiple of the length of said sections and of said inner leaves, said main portions being provided with pictures on opposite sides thereof, and said sections and inner leaves being provided with interchangeable sections of pictures on opposite sides thereof.

6. A book or pamphlet consisting of a plurality of leaves, each leaf consisting of a main portion and an outer foldable section, the latter being approximately half the length of the former, and a plurality of inner leaves of approximately the length of said sections, said main portions being provided with a picture, and said sections and inner leaves being provided with interchangeable sections of pictures.

7. A book or pamphlet consisting of a plurality of leaves, each leaf consisting of a main portion and an outer section, foldable on both sides thereof, said outer section being approximately half the length of said main portion, a plurality of inner leaves approximately the same length as said sections and foldable upon both sides of said back leaves, said main portions being provided with pictures on both sides thereof, and said sections and inner leaves being provided with interchangeable sections of pictures on both sides thereof.

THEODORE E. WIEDERSEIM, Jr.

Witnesses:
JOHN A. WIEDERSHEIM,
WM. CANER WIEDERSHEIM.